Aug. 25, 1931.   H. D. GEYER   1,820,133
RESILIENT CONNECTER
Filed Oct. 17, 1929

Inventor
Harvey D. Geyer
By Spencer Hardman & Fehr
His Attorneys

Patented Aug. 25, 1931

1,820,133

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

RESILIENT CONNECTER

Application filed October 17, 1929. Serial No. 400,423.

This invention relates to metal-isolating resilient connecter units adapted to be manufactured as a unit and readily assembled in place in the manner of an ordinary connecter fitting for mounting any member upon its support.

An object of the invention is to provide a very simple and efficient resilient connecter unit which can be manufactured at a relatively low cost.

Another object is to provide such a resilient connecter wherein the elastic material is permanently compressed to the desired initial compression when the unit is made and neither requires nor permits further adjustment of this initial compression at any later time, whereby improper adjustment by unskilled persons is prevented.

A further object is to provide such a connecter wherein the resilient material transmits vertical loads by a shearing stress thereupon, the vertical areas under such shear stress being relatively large compared to the horizontal areas to reduce the shear stress per unit area and to prevent excessive movement between the connected parts.

Further objects and advantages of the present invention will be apparent from the following description, reference being had to the accompanying drawings wherein a preferred embodiment of one form of the present invention is clearly shown.

In the drawings.

Similar reference characters refer to similar parts throughout the several views.

Figure 3:
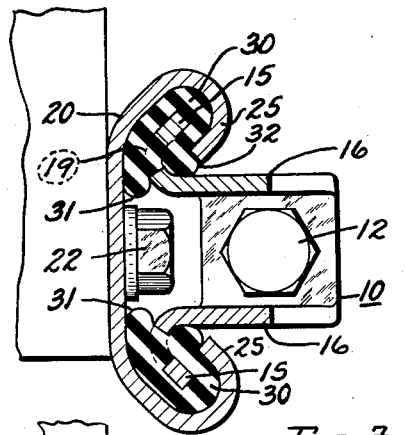
Fig. 3 is a horizontal section on line 3—3 of Figs. 1 and 2.
Figure 2:
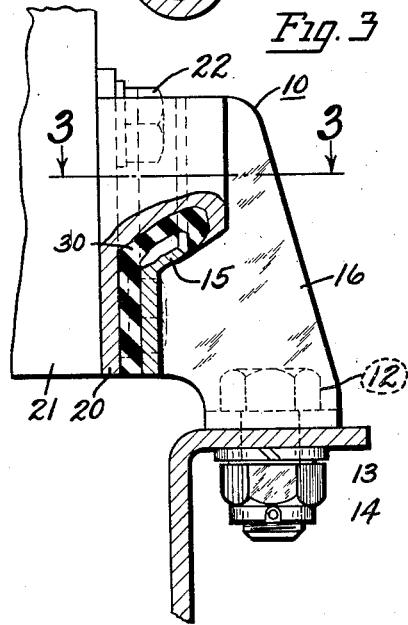
Fig. 2 is a side elevation of the connecter of Fig. 1 but shows a portion broken away to more clearly illustrate the interior structure.

Numeral 10 marks the pressed metal member which is rigidly fixed to the chassis frame member 11 by means of the bolt 12, lock washer 13, and nut 14. Member 10 has two elongated vertical flanges 15 projecting laterally outwardly from opposite sides thereof. Preferably flanges 15 are bent outwardly at an angle of more than 90 degrees so that they are inclined at an acute angle to the sides 16 of member 10, as clearly shown in Fig. 3. This backward inclination of flanges 15 makes for rigidity and strength of member 10 and also provides for a better interlocking of said flanges with the second pressed metal member 20 as will hereinafter appear.

Figure 1:
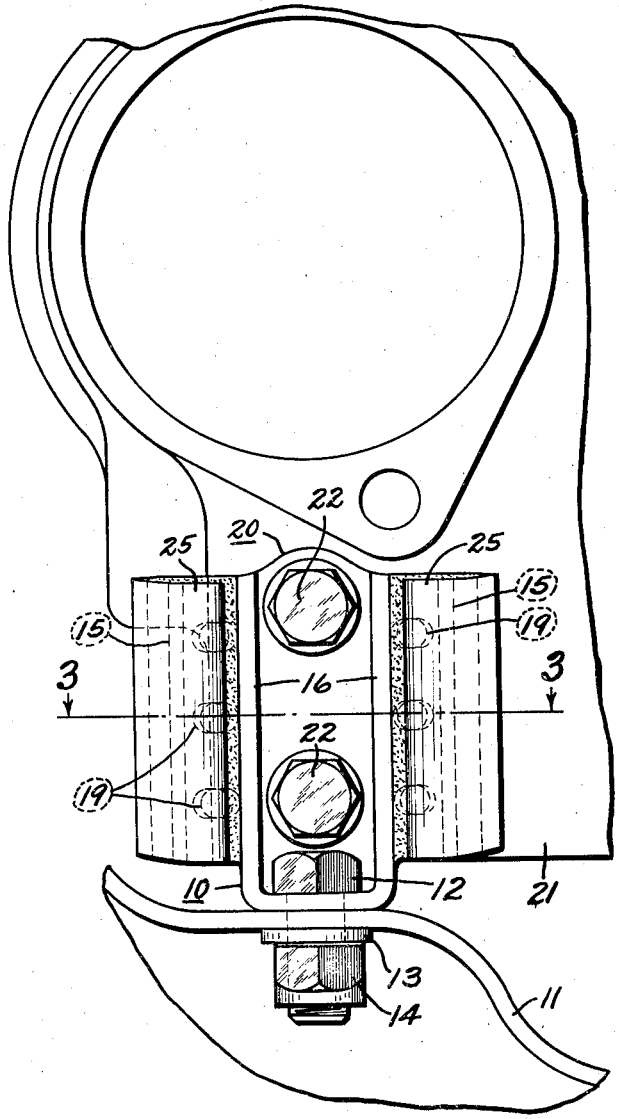
Fig. 1 shows the resilient connecter of this invention assembled in place and connecting a portion of an automobile engine upon its supporting chassis frame member.

This second pressed metal member 20 is rigidly fixed to a vertical surface 21 of a portion of the engine by means of the two bolts 22, as clearly illustrated. Access to the bolts 22 with a socket wrench is obtained by passing the socket wrench in between the two sides 16 of member 10 (see Figs. 1 and 3).

Access to the bolt head 12 with a socket wrench is obtained in a similar manner with the shank of the wrench extending vertically. Two elongated resilient rubber blocks 30 fit snugly around the two laterally projecting flanges 15 and are held under a permanent initial high compression by the flanges 25 being bent around the rubber blocks 30 and compressing the same upon both sides of the vertical flanges 15, as clearly illustrated. Obviously the rubber blocks 30 isolate member 10 from member 20 and provide a resilient connection therebetween which prevents transmission of sound or other high frequency vibrations from the engine to the chassis frame. The degree of compression of the rubber is such that the connection is sufficiently solid to properly support the engine without material movement in the elastic connection so that the engine will be maintained in proper alignment. Preferably flanges 15 each have a series of small recesses or apertures 19 into which the resilient rubber 30 is forced by the high compression to which it is subjected (see Fig. 3). It will be noted that, since flanges 15 and 25 are vertical or substantially vertical, the weight load of the engine will be taken by the resistance of the resilient blocks 30 to a shearing stress. Of course the high compression on the rubber is such that there will be a non-slipping bond between the rubber and the metal surfaces of both the interior flanges 15 and the exterior flanges 25 and hence all relative movement between members 10 and 20 is taken by an internal shearing distortion in the resilient rubber. For this reason the vertical surfaces of the rubber which are subjected to such shearing stresses are made large relative to the horizontal surfaces thereof, whereby the volume or weight of rubber in the connecter is used to the greatest advantage. It will be clear that horizontal loads upon the connecter in any direction will be taken by a direct compression in the rubber on one of the surfaces of the curved flanges 15. When flanges 25 are bent around and forced down upon the rubber blocks 30 to highly compress the same, the resilient rubber is materially distorted and caused to flow or bulge outwardly as the unconfined edges as shown at the bulges 31 and 32 (see Fig. 3). The rubber fibers at the outer portions of these bulges 31 and 32 are therefore bowed out under tension, which tension resists further outward bulging of the rubber when the applied load is put upon the connecter. For this reason the resilient rubber will not be subjected to material movement or strain under variation in applied load and hence its useful life will be greatly increased. It will be noted that vertical loads upon the connecter (which in this case are the principal loads) put only a shearing stress upon the rubber which has little or no tendency to cause further outward bulging of the rubber at points 31 and 32.

In the manufacture of this connecter, the resilient rubber blocks 30 are preferably molded approximately to shape but of slightly thicker section than as shown in Fig. 3. The members 10 and 20 are pressed metal stampings and are cheaply made by well-known methods. The two molded blocks 30 are slipped upon the two projecting flanges 15 of member 10 and then this assembly is inserted within the member 20 which, at this stage of manufacture, has its flanges 25 not yet bent down so as to permit this insertion of parts 10 and 30. The next step is the bending of flanges 25 around the rubber blocks 30 and the interior flanges 15 putting the rubber under a high internal compression and causing a tight nonslipping bond between the rubber and its confining metal walls. This final bending of flanges 25 to permanently assemble all the parts of the connecter can be simply and efficiently done by a suitable die press in a manner well known to those skilled in the art. The resilient connecter will be then a complete unit which can be shipped to any point and assembled upon the parts to be connected thereby in a very simple manner by means of bolts 12 and 22 and a socket wrench, as above described.

While the form of embodiment of the present invention as herein disclosed, constitutes a preferred form, it is to be understood that other forms might be adopted, all coming within the scope of the claims which follow.

What is claimed is as follows:

1. A vibration absorbing resilient connecter connecting two parts for preventing transmission of vibrations therebetween, comprising: a metal member fixed to one of said connected parts and having two laterally projecting substantially vertical flanges on opposite sides thereof, elastic rubber material encasing said vertical flanges, and a second metal member fixed to the other of said connected parts and isolated from said first member and having portions thereof bent around the outside edges of said vertical flanges so as to clamp the rubber material under a permanent high compression, whereby vertical loads upon the connecter are sustained.

2. A vibration absorbing resilient connecter connecting two parts for preventing transmission of vibrations therebetween, comprising: a metal member fixed to one of said connected parts and having two flanges projecting outwardly from opposite sides thereof, non-metallic elastic material surrounding both sides and the outer edge of each of said flanges, and a second metal member fixed to the other of the connected parts and having two laterally projecting portions bent around the outside edges of said two flanges and permanently clamped tightly down upon the elastic material so as to retain said members together by a permanent high compression upon said elastic material, and attaching bolts or the like for fixing said second metal member to its connected part extending between said flanges.

In testimony whereof I hereto affix my signature.

HARVEY D. GEYER.